(12) United States Patent
Bender et al.

(10) Patent No.: US 6,660,407 B1
(45) Date of Patent: Dec. 9, 2003

(54) FRICTION-WELDED SHAFT-DISC ASSEMBLY AND METHOD FOR THE MANUFACTURE THEREOF

(75) Inventors: Jens Bender, Stuttgart (DE); Cornelius Hentrich, Waiblingen (DE); Jan Köll, Esslingen (DE); Theodor Mayer, Ebersbach (DE); Rudolf Reinhardt, Esslingen (DE); Hans Zechmann, Kernen (DE); Rudolf Paasch, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/031,748

(22) PCT Filed: Jun. 17, 2000

(86) PCT No.: PCT/EP00/05587

§ 371 (c)(1), (2), (4) Date: Jun. 11, 2002

(87) PCT Pub. No.: WO01/07200

PCT Pub. Date: Feb. 1, 2001

(30) Foreign Application Priority Data

Jul. 24, 1999 (DE) .......................... 199 34 855

(51) Int. Cl.$^7$ .......................... B32B 15/00; B23K 31/02

(52) U.S. Cl. .................... 428/615; 228/112.1; 228/128

(58) Field of Search .................... 228/2.1, 2.3, 112.1, 228/113, 114, 114.5, 126, 128, 131; 74/572; 301/126; 464/81; 428/544, 615; 403/270, 271, 272

(56) References Cited

U.S. PATENT DOCUMENTS

| | | | | |
|---|---|---|---|---|
| 3,631,585 A | * | 1/1972 | Stamm .................... | 228/114.5 |
| 4,087,038 A | * | 5/1978 | Yagi .......................... | 228/114.5 |
| 4,335,586 A | * | 6/1982 | Kochendorfer et al. ....... | 464/81 |
| 4,538,969 A | * | 9/1985 | Ammann et al. ............ | 417/407 |
| 4,747,722 A | * | 5/1988 | Kawaguchi et al. .......... | 403/30 |
| 4,850,802 A | * | 7/1989 | Pankratz et al. ......... | 416/213 R |
| 4,872,817 A | * | 10/1989 | De Kruif ..................... | 417/407 |
| 4,874,674 A | * | 10/1989 | Oda et al. .................... | 428/469 |

(List continued on next page.)

FOREIGN PATENT DOCUMENTS

| | | |
|---|---|---|
| DE | 2735074 | 2/1979 |
| DE | 3834080 A | * 4/1990 |
| DE | 19519576 | 12/1996 |
| EP | 0372663 | 6/1990 |
| EP | 000513646 A1 | * 11/1992 |
| JP | 11320132 A | * 11/1999 |

OTHER PUBLICATIONS

WO 01/07200A1 Bender et al. (Feb. 1, 2001).*
WO 95/32833 Nied et al. (Dec. 7, 1995).*
B. R. Pavey, et al. "Aspects of the Use of Conical Joints for Friction Welding Applications" Welding and Metal Fabrications, 1972.
Copy of the International Search Report (Feb. 1, 2001).

*Primary Examiner*—Kiley Stoner
(74) *Attorney, Agent, or Firm*—Crowell & Moring LLP (57) ABSTRACT

A composite shaft/disc workpiece which is assembled from a disc with a passage hole and from a shaft by friction welding is disclosed. The outer wall of the shaft has a plurality of steps in the connection region with the disc, the radius of the steps becoming larger in a direction of the axis. The passage hole of the disc is provided with webs, the radius of which likewise becomes larger in a direction of the axis and between which annular recesses are present. The webs and steps to be connected overlap in the radial direction, so that, during the welding of the shaft and disc, annular connecting portions are obtained in the region of the webs and steps, annular cavities being formed between the connecting portions. The cavities represent a weight saving, as compared with composite shaft/disc workpices made of solid material, and can also be used as parts of media ducts.

16 Claims, 5 Drawing Sheets

U.S. PATENT DOCUMENTS

| | | | | |
|---|---|---|---|---|
| 4,982,826 A | * | 1/1991 | Holbrook | 192/106 F |
| 4,983,064 A | * | 1/1991 | Kawaguchi et al. | 403/30 |
| 5,064,112 A | * | 11/1991 | Isobe et al. | 228/112.1 |
| 5,205,464 A | * | 4/1993 | Simon | 228/114 |
| 5,248,078 A | * | 9/1993 | Deal et al. | 228/113 |
| 5,314,106 A | * | 5/1994 | Ambroziak et al. | 228/114.5 |
| 5,431,752 A | * | 7/1995 | Brogle et al. | 148/516 |
| 5,603,670 A | * | 2/1997 | Mozer | 474/43 |
| 5,752,725 A | * | 5/1998 | El-Sobky | 285/21.1 |
| 5,881,607 A | * | 3/1999 | Ito et al. | 74/572 |
| 5,885,162 A | * | 3/1999 | Sakamoto et al. | 464/145 |
| 6,065,813 A | * | 5/2000 | Fett et al. | 301/124.1 |

* cited by examiner

FRICTION-WELDED SHAFT-DISC ASSEMBLY AND METHOD FOR THE MANUFACTURE THEREOF

BACKGROUND AND SUMMARY OF THE INVENTION

This application claims the priority of German Patent Document 199 34 855.3, filed Jul. 24, 1999, and PCT/EP00/05587, filed Jun. 17, 2000, the disclosures of which are expressly incorporated by reference herein.

The invention relates to a composite shaft/disc workpiece assembled by friction welding and to a method for producing the same.

In vehicle and machine building, composite workpieces composed of a shaft and of an essentially rotationally symmetrical disc are employed in numerous applications. Examples of such discs are gear and clutch parts or else disc-shaped blanks which still have to be machined mechanically.

European Patent Document EP 372 663 A1 discloses a method, with the aid of which a shaft and a disc can be connected in a connection region by means of friction welding. For this purpose, the shaft is provided in the connection region with a conical or stepped outer surface, while the disc is provided with a conical or stepped passage hole corresponding to the connection region on the shaft. This configuration of the connection region has the effect of centering the shaft in relation to the disc during the friction-welding operation. When the shaft is being welded to the disc, either two conical individual surfaces of approximately negative shape meet one another, so that the friction-welded component has a coherent conical connection surface, or a plurality of radially adjacent planar annular surfaces offset in the axial direction meet one another, so that a connection surface composed of a plurality of planar steps is obtained. In both cases, a large-area connection region which is approximately free of cavities is obtained.

With a view to saving weight in engines, transmissions, etc., it is advantageous to use composite shaft/disc workpieces, the shafts of which are designed as hollow shafts. The method described in EP 372 663 A1, in which the steps or the cone in the connection region serve(s) for centring the shaft in relation to the disc and in which a large-area connection region between the shaft and the disc is obtained, cannot be employed, however, particularly in the case of thin-walled hollow shafts, since the wall of the hollow shaft is softened as a result of the large-area heating during friction welding, to an extent such that, when the disc is pressed on, deformation of the shaft wall is initiated. In the method of EP 372 663 A1, therefore, the hollow shaft cannot oppose the disc in the connection region with sufficient pressure resistance for welding, and the disc can be slipped over the connection region, instead of making a fixed rigid connection with the hollow shaft.

Furthermore, particularly in the case of shafts rotating at high speed, for example in transmissions, it is necessary to achieve a further saving of weight and a low mass moment of inertia in relation to the axis. There is therefore a great need for composite shaft/disc workpieces which have a reduced weight, in particular, even in regions distant from the axis, that is to say even in the region of the disc, and at the same time a high design strength of the shaft/disc connection must be ensured.

The present invention provides a composite shaft/disc workpiece which has a reduced weight, as compared with the prior art, and has a low mass moment of inertia in relation to the axis of rotation. Further, a method for producing such a composite workpiece is provided.

Accordingly, the shaft is provided, in a connection region in which the disc is to be welded to the shaft, with a plurality of rotationally symmetrical steps, the diameter of which becomes increasingly large in a direction of the axis. On the other hand, the disc is provided with a passage hole in the region of the axis of rotation. The passage hole is configured in such a way that it has a plurality of rotationally symmetrical webs which project from the disc towards the axis of rotation. The inside diameter of the webs is selected such that each web forms a passage hole, the inside diameter of which is smaller by a welding overlap than the step which is located in the connection region of the shaft and which is opposite this web in the assembled position. The disc is assembled, together with the shaft, by friction welding. At the same time, the webs are connected to the steps, and, in the region of the webs, annular weld seams are obtained which, depending on the size of the welding overlap, have a more or less conical shape. Annular cavities are obtained at the same time between successive webs.

Considerable weight savings can be achieved by means of these cavities, as compared with a conventional filled connection region. In particular, the mass moment of inertia of the composite workpiece composed of the shaft and the disc can thereby be greatly reduced. A high rigidity of the connection is achieved by means of the annular weld seams which lie parallel to one another. Good welding quality is ensured when the welding overlap of the webs in relation to the steps is about 1 mm to 3 mm. The weld seams formed in this case cover a region of 5 mm to 15 mm in the axial direction of the composite workpiece and are slightly tilted conically in relation to the axial direction of the composite workpiece.

In order to achieve the greatest possible saving of weight of the composite workpiece composed of the shaft and disc, it is advantageous to design the shaft as a hollow shaft. In order to avoid a radial bulging of the hollow shaft in the direction of the axis during friction welding, particularly when a hollow shaft of small wall thickness is used, the interior of the hollow shaft is provided in the connection region with a supporting element, by means of which deformations of the hollow shaft are prevented.

A particularly large saving of weight and reduction in the mass moment of inertia is achieved when the disc is composed of a conical sheet-metal dish and of a supporting frame, the supporting frame having a plurality of annular supporting webs, to which the sheet-metal dish is fastened. The supporting webs give the sheet-metal dish rigidity, while the weight of the disc is reduced by means of the cavities located between the supporting webs. The sheet-metal dish and the supporting structure may in this case consist of different materials. Thus, the sheet-metal dish may be manufactured from a carbon steel which is capable of tolerating the highest possible compressive and frictional forces, while the supporting structure is produced from a suitable lightweight material. The webs of the supporting frame are expediently connected by friction welding to the sheet-metal dish wall located opposite them.

The cavities formed between the webs and the outer wall of the shaft in the assembled position may expediently be used for carrying liquid and gaseous media. In particular, they serve for the radial (circulatory) distribution of lubricating oil or pressure oil which is carried via oil ducts inside the shaft and is guided onto the outer surface of the shaft at defined locations in the surroundings of the disc. The annular cavity in this case makes it possible to have a substantial simplification in the geometry and production of the oil ducts. Arranging the bores in pairs opposite one another reduces unbalance.

The method according to the invention makes it possible to connect shafts to discs made of different materials. In particular, it allows a reliable assembly of a disc consisting of any desired friction-weldable material together with a hardened steel shaft. The disc and shaft can thus be ready-machined separately and hardened, as required, before they are assembled to form a composite workpiece.

The invention is explained in more detail below by several exemplary embodiments illustrated in the drawings.

BRIEF DESCRIPTION OF THE DRAWINGS

FIG. 2b shows, as a detail, a view of a composite workpiece consisting of a disc and of a hollow shaft supported in the welding region by a cylindrical piece, according to the inset IIb marked in FIG. 2a.

DETAILED DESCRIPTION OF THE DRAWINGS

Figure 1A:
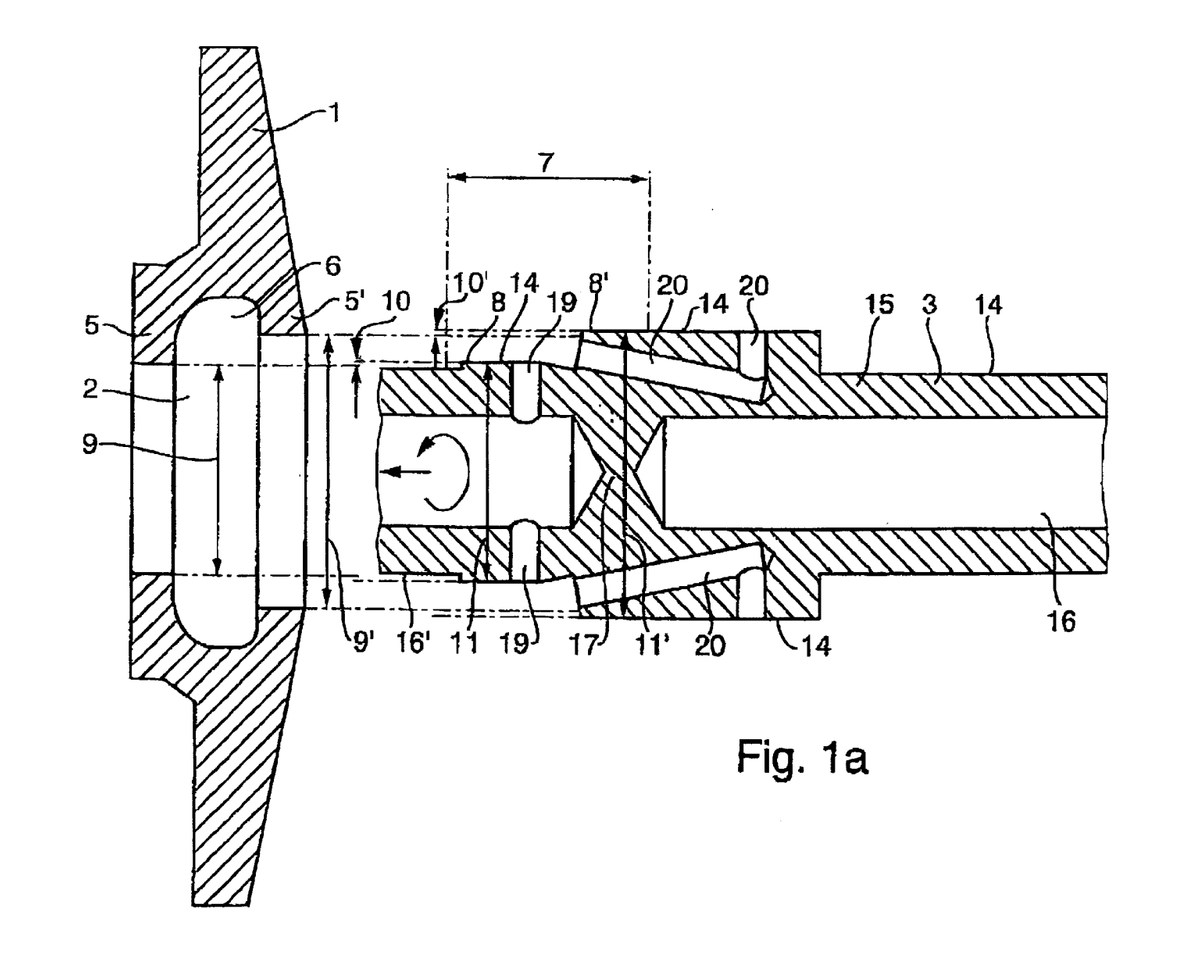
FIG. 1a shows a view of a disc and of a shaft which are to be assembled to form a composite shaft/disc workpiece.
Figure 1B:
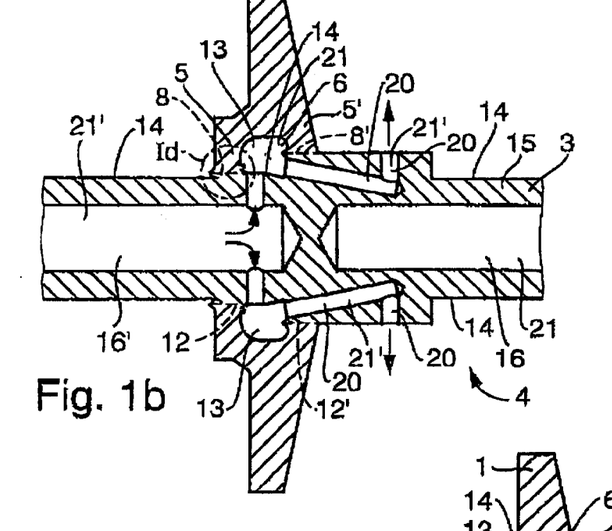
FIG. 1b shows a view of the friction-welded composite shaft/disc workpiece.
Figure 1C:
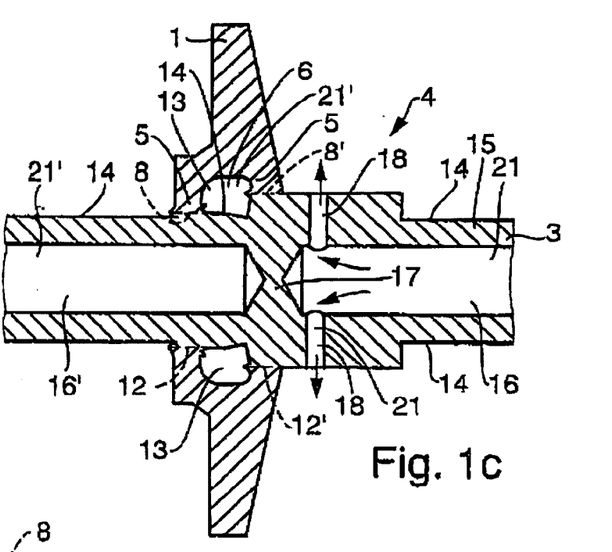
FIG. 1c shows a view of the friction-welded composite shaft/disc workpiece, rotated through 90 degrees about the shaft axis in relation to FIG. 1b.

FIG. 1a shows a rotationally symmetrical disc 1 with a passage hole 2 and a shaft 3, which are to be assembled together to form a composite shaft/disc workpiece 4 illustrated in FIGS. 1b and 1c. The disc 1 has, in the region of the passage hole 2, two annular webs 5, 5' which face the shaft 3 and enclose an annular recess 6. The shaft 3 has, in a connection region 7, two steps 8, 8' which, when the shaft 3 and disc 1 are assembled, are connected to the webs 5, 5' of the disc 1 in such a way that the step 8 coincides with the web 5 and the step 8' with the web 5'.

The inside diameter 9 of the web 5 is smaller by a welding overlap 10 than the outside diameter 11 of the step 8, and the inside diameter 9' of the web 5' is smaller by a welding overlap 10' than the outside diameter of the step 8', so that shaft 3 and disc 1 overlap radially in the region of these webs 5, 5' and steps 8, 8' before assembly.

Figure 1D:
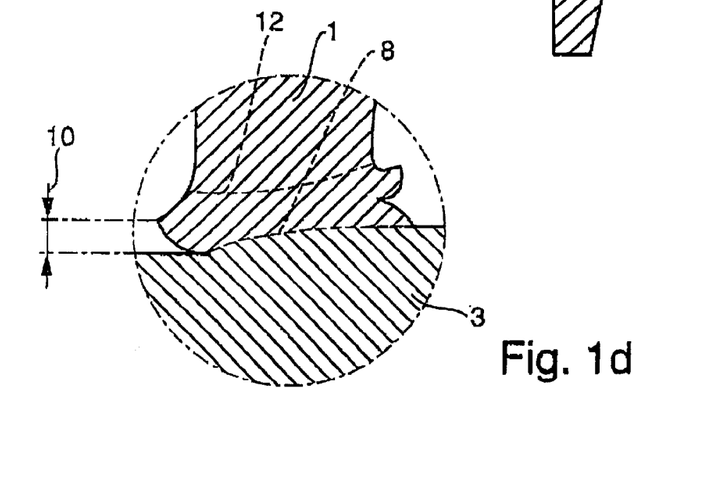
FIG. 1d shows, as a detail, a view of the region Id marked in FIG. 1b.

The disc 1 and shaft 3 are connected to one another by friction welding. In this case, for example, as indicated by the arrow in FIG. 1a, the shaft 3 is set in rotation and displaced axially in the direction of the (stationary) disc 1 until the steps 8, 8' of the shaft 3 come into contact with the webs 5, 5' of the disc 1 and at the same time have the effect of heating the webs 5, 5' and the steps 8, 8' locally in the regions of mutual contact. In this case, softening and deformation of the webs 5, 5' and of the steps 8, 8' takes place in the surroundings of the regions of mutual contact. This gives rise to an assembly zone 12 which, as illustrated by hatching in the illustration of a detail in FIG. 1d, runs obliquely to the shaft axis. During the assembly of the shaft 3 together with the disc 1, a fixed leak-tight connection of the webs 5, 5' to the steps 8, 8' is obtained, so that the recess 6 between the webs 5, 5' forms a closed annular cavity 13 which is delimited, on the one hand, by the recess 6 of the disc 1 and, on the other hand, by the outer wall 14 of the shaft 3.

For applications in the engine and transmission sector, the shaft 3 and disc 1 typically consist of steel materials. However, friction welding also makes it possible to assemble workpieces of different materials and, in particular, also assemble hardened assembly points. Thus, the shaft 3 and disc 1 may consist of different materials or the shaft 3 may be hardened in the connection region 7 even before assembly.

FIGS. 1b and 1c show the welded composite shaft/disc workpiece 4, the view of FIG. 1c being rotated through 90 degrees about the shaft axis in relation to the view of FIG. 1b. The shaft 3 is a solid shaft 15 which, for weight-saving reasons inter alia, is provided with two drilled inner spaces 16, 16'. Between the inner spaces 16, 16' is located a separating web 17 which separates from one another and supports the two inner spaces 16, 16'. In the present embodiment, the inner space 16 located on the right of the separating web 17 is connected to the outer wall 14 of the shaft 3 via an outlet orifice 18. The inner space 16' located on the left of the separating web 17 is connected via a connecting bore 19 to the closed annular cavity 13 which is itself provided with an outlet orifice 20 to the outer wall 14 of the shaft 3. The two inner spaces 16, 16' thus form parts of two independent media ducts 21, 21' which overlap in the axial direction of the shaft 3 and in which, for example, pressure oil can be carried. Different pressures can be exerted via these media ducts 21, 21', at the outlet orifices 18, 20, on connection elements (not illustrated in FIGS. 1b and 1c) which are connected fixedly or axially displaceably to the shaft 3. Instead of carrying pressure oil, the media ducts 21, 21' may also be used for carrying or distributing any other media, such as, for example, lubricating oil, compressed air, cooling media, etc., along the composite shaft/disc workpiece 4. Unbalances can be reduced by virtue of the symmetrical arrangement of the media ducts 21, 21' with respect to the axis of rotation.

As shown in FIG. 1a, the outlet orifices 18, 20 and the connecting bore 19 may be introduced into the shaft 3 even before the shaft 3 and the disc 1 are assembled. The friction welding of the steps 8, 8' on the shaft 3 and of the webs 5, 5' on the disc 1 gives rise, in the connection region 7, to the annular cavity 13 which, together with the outlet orifice 20, the connecting bore 19 and the inner space 16', forms the media duct 21'.

Figure 2A:
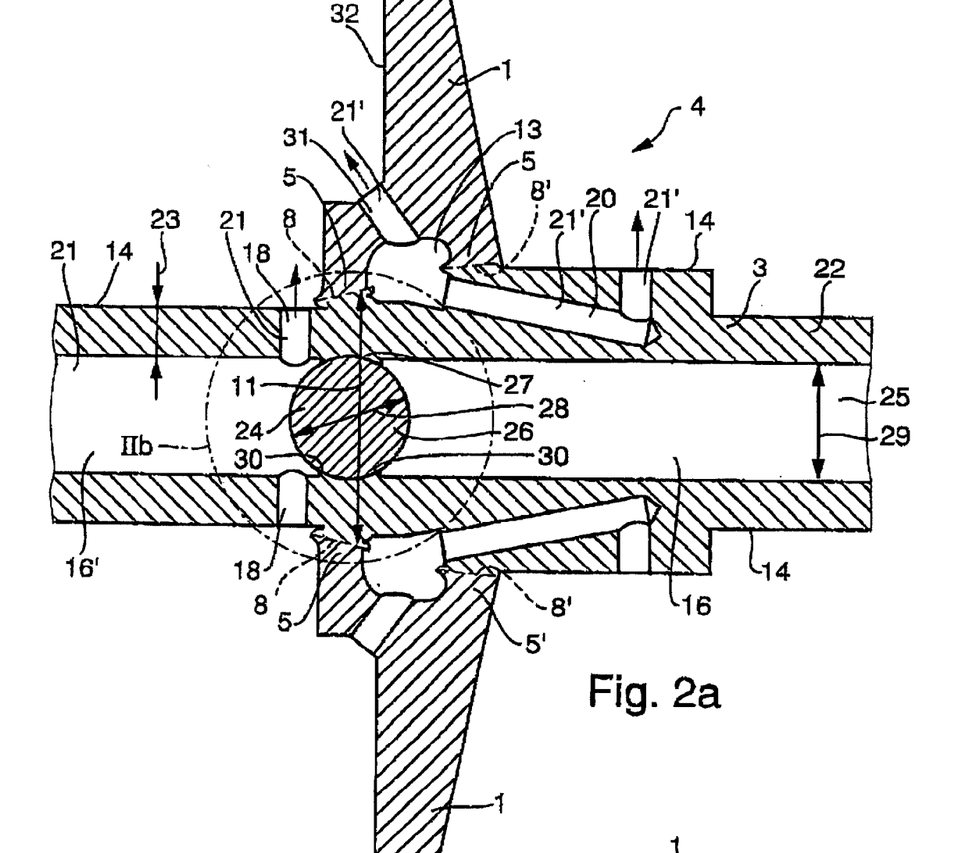
FIG. 2a shows a view of a composite workpiece consisting of a disc and of a hollow-shaft wall supported in the welding region by a ball.

FIG. 2a shows a composite shaft/disc workpiece 4 which is built from a shaft 3 designed as a hollow shaft 22 and from a disc 1. To fasten the disc 1 by means of friction welding, the outer wall 14 of the hollow shaft 22 is provided, in a similar way to the exemplary embodiment shown in FIG. 1a, with two steps 8, 8', to which the webs 5, 5' of the disc 1 are connected. The steps 8, 8' on the hollow shaft 22 may be produced by transverse rolling, transverse extrusion or cutting machining of the hollow shaft 22.

For weight-saving reasons, it is often advantageous for the wall thickness selected for the hollow shaft 22 to be as small as possible. In this case, there is a particularly small wall thickness 23 of the hollow shaft 22 in the region of the step 8 having the smaller outside diameter 11 (see, in this respect, FIG. 1a). To support this step 8, a supporting element 24 is positioned in the interior 25 of the hollow shaft 22 in such a way that the supporting element is located opposite the step 8 and therefore that point on the hollow shaft 22 which is the weakest in terms of the friction-welding process. The supporting element 24 prevents the hollow shaft 22 from bulging inwards in the region of the step 8 during friction welding and thus ensures that, even in the case of thin-walled hollow shafts 22, the required frictional forces for welding the steps 8, 8' on the shaft 3 and the webs 5, 5' on the disc 1 can be applied.

FIG. 2a shows an exemplary embodiment, in which the supporting element 24 is designed as a ball 26 which is pressed, before friction welding, into that region 27 of the interior 25 of the hollow shaft 22 which is located opposite the step 8. The outside diameter 28 of the ball 26 is in this case adapted to the inside diameter 29 of the hollow shaft 22. During the friction welding of the web 5 together with the step 8, the plastic deformation of the relatively thin-walled hollow shaft 8 gives rise, in the surroundings of the pressed-in ball 26, to annular beads 30 which have the effect of a fixed leak-tight fit of the ball 26 in the interior 25 of the hollow shaft 22 after the cooling of the composite shaft/disc workpiece 4. The interior 25 of the hollow shaft 22 is therefore divided by the ball 26 into two separate inner regions 16 and 16'. By means of drilled outlet orifices 18, the inner region 16' located on the left of the ball 26 is connected to the outer wall 14 of the hollow shaft 22 and thus forms a media duct 21 which may be used, for example, for supplying lubricating or pressure oil to bearings or cavities which the outer wall 14 of the hollow shaft 22 forms with counterpieces (not illustrated in FIG. 2a) in the region of the outlet orifices 18. The inner region 16 located on the right of the ball 26 is separated by the ball 26 from the inner region 16' located on the left. The annular cavity 13 constitutes part of a further media duct 21' which is connected by the outlet orifice 20 to that outer wall 14 of the hollow shaft 22 which is located on the right of the disc 1 and by the inlet orifice 31 on the disc 1 to that outer region 32 of the disc 1 which is located on the left of the web 5. This media duct 21' thus has the effect of bridging the disc 1 axially inside the composite shaft/disc workpiece 4.

All the inlet and outlet orifices 18, 20, 31 required for producing the media ducts 21, 21' may be applied to the disc 1 or the shaft 3 before welding, without an exact meridional assignment of the disc 1 and shaft 3 thereby needing to be adhered to during assembly. To be precise, since the cavity 13 has a radially symmetrical annular shape, it does not matter at which meridional position the inlet orifice 31 on the disc 1 is positioned in relation to the outlet orifice 20 on the shaft 3, since, irrespective of the mutual positioning of the shaft 3 and disc 1, a continuous media duct 21' is always formed. During the friction-welding operation, the outlet orifice 20 on the shaft 3 or the inlet orifice 31 on the disc 1 may be used for the delivery of protective gas, depending on whether the disc 1 is rotated in relation to the shaft 3 or vice versa.

Figure 2B:
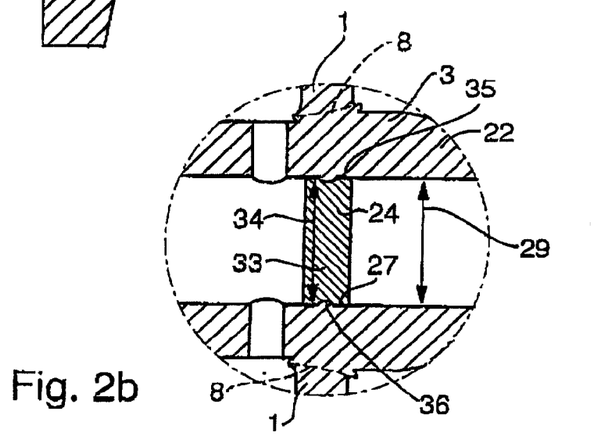

In the detail, shown in FIG. 2b, of the composite shaft/disc workpiece 4, the supporting element 24 is a cylindrical piece 33 which has an outside diameter 34 adapted to the inside diameter 29 of the hollow shaft 22 and which is pressed before friction welding into that region 27 of the interior 25 of the hollow shaft 22 which is located opposite the step 8. In order to cover the entire friction-welding region in the region of the step 8, the thickness of the cylindrical piece 33 corresponds approximately to the thickness of the web 5, to be assembled together with the step 8, on the disc 1. The outer wall 35 of the cylindrical piece 33 is provided with a peripheral annular groove 36, into which hollow-shaft material penetrates as a result of the plastic deformation of the hollow shaft 22 during the friction-welding process and ensures a firm fit of the cylindrical piece 33 in the interior 25 of the hollow shaft 22 after cooling. A further weight saving can be achieved if the cylindrical piece 33 is produced from a lightweight material, for example aluminium.

Figure 3:
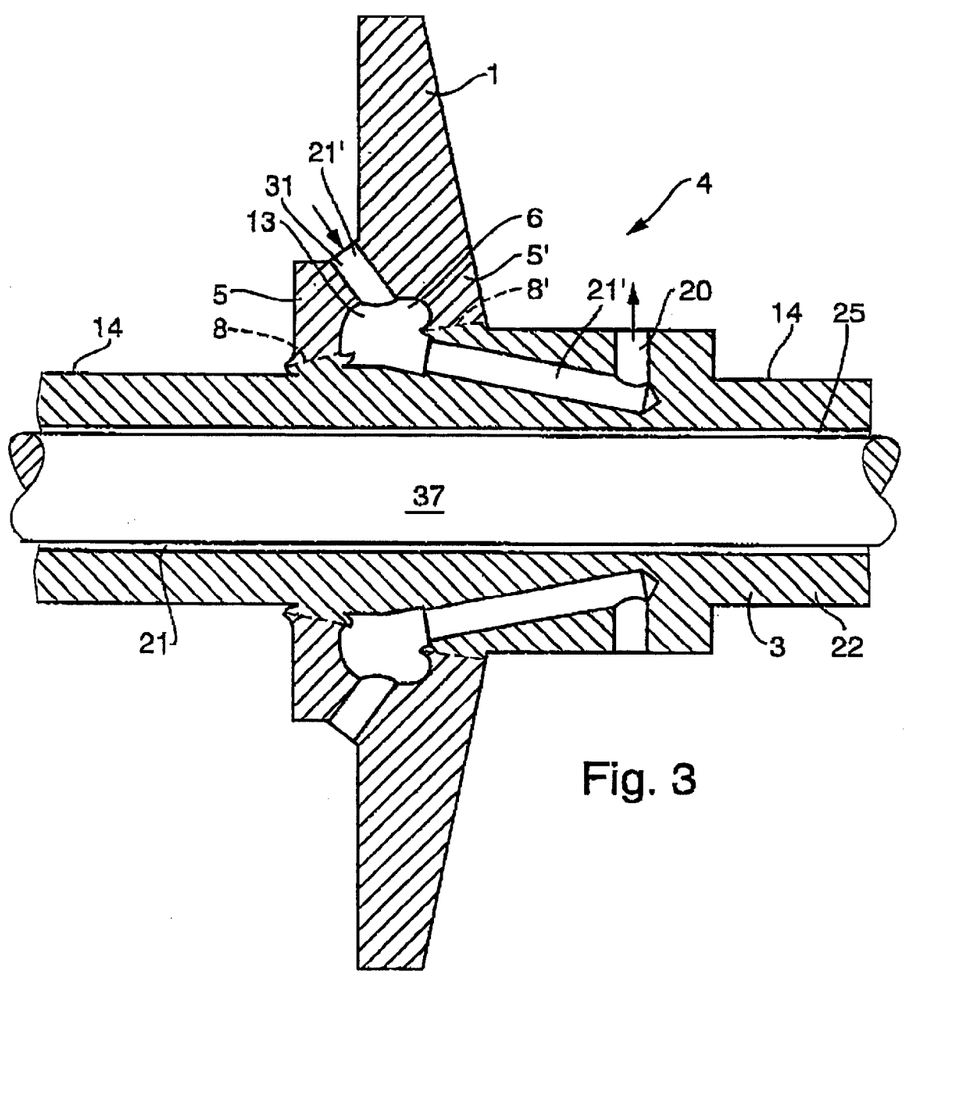
FIG. 3 shows a view of a composite workpiece consisting of a disc and of a hollow shaft with a rotating shaft inside the composite workpiece.

FIG. 3 shows a further exemplary embodiment of a composite shaft/disc workpiece 4 consisting of a hollow shaft 22 and of a disc 1. Guided through the interior 25 of the hollow shaft 22 is a rotating inner shaft 37, the outside diameter of which is smaller than the inside diameter of the hollow shaft 22, so that the inner shaft 37 can rotate, free of contact, in relation to the hollow shaft 22. In a similar way to the embodiment of FIG. 1b, here too, the disc 1 has two webs 5, 5', in the region of which the disc 1 is connected to the steps 8, 8' of the shaft 3. Between the webs 5, 5', the disc has an annular recess 6 which, after the welding of the shaft 3 and disc 1, forms an annular cavity 13 between the disc 1 and the outer wall 14 of the hollow shaft 22. The composite shaft/disc workpiece 4 has a media duct 21' which is configured in a similar way to the exemplary embodiment of FIG. 2a and therefore comprises the inlet orifice 31 on the disc 1, the annular cavity 13 and the outlet orifice 20 on the hollow shaft 3. If the interior 25 of the hollow shaft 22 is not required for guiding an inner shaft 37, the interior 25 may also be used as a further media duct 21, through which, for example, lubricating oil is carried or distributed along the hollow shaft 22.

Figure 4:
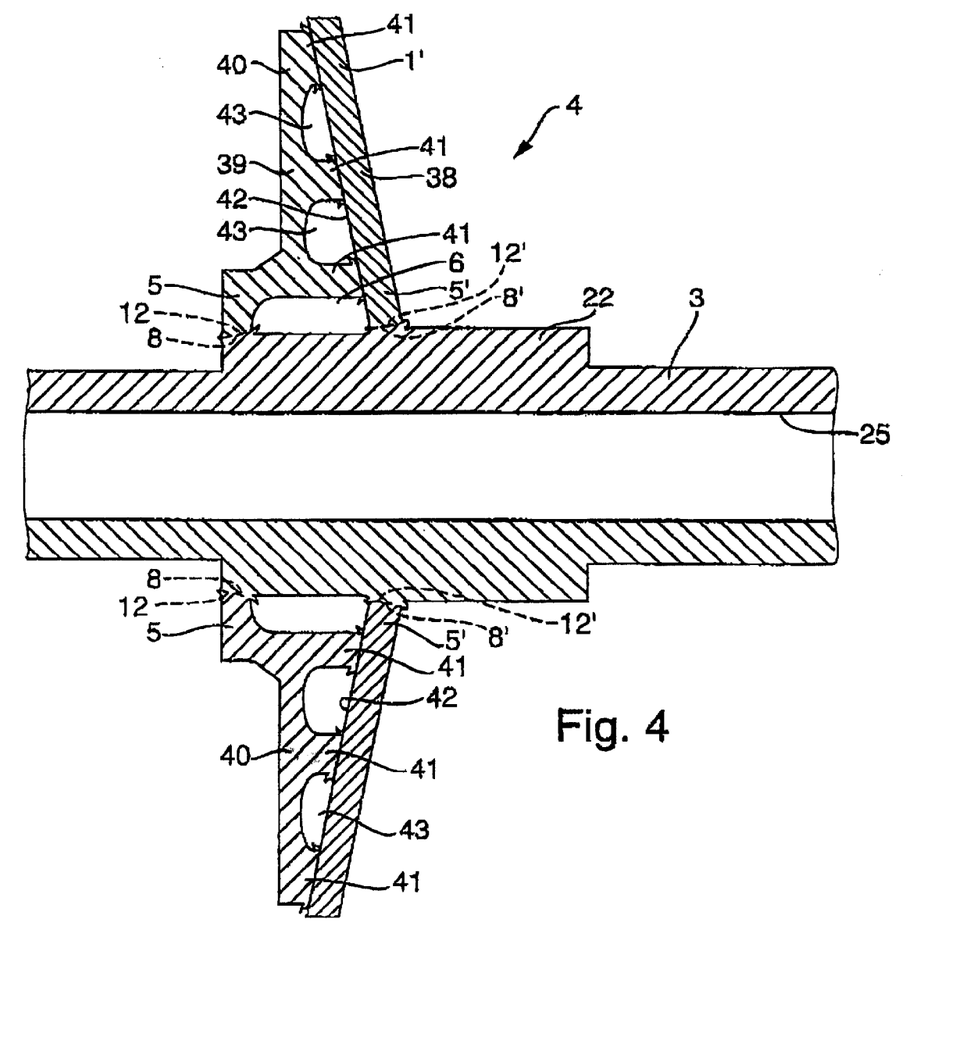
FIG. 4 shows a view of a composite shaft/disc workpiece with a built disc.

Finally, FIG. 4 shows a composite shaft/disc workpiece 4 consisting of a shaft 3 and of a disc 1, the disc 1' illustrated here consisting of a conical sheet-metal dish 38 and of a supporting frame 39. The supporting frame 39 comprises a rotationally symmetrical disc-shaped dish 40, from which a plurality of annular supporting webs 41 project approximately in the axial direction and are connected by friction welding to the rear wall 42, located opposite them, of the sheet-metal dish 38. The supporting webs 41 give rise, between the rear wall 42 of the sheet-metal dish 38 and the dish 40 of the supporting frame 39, to annular cavities 43 which represent a considerable saving of weight and a reduction in the mass moment of inertia of the disc 1' illustrated here, as compared with the discs 1 made of solid material which are illustrated in FIGS. 1 to 3. For the composite shaft/disc workpiece 4 to be used in a transmission, the sheet-metal dish 38 consists of a high-strength material which is insensitive to abrasive forces, for example of a carbon steel. The supporting frame 39 having the supporting webs 41, to which the sheet-metal dish 38 is fastened radially peripherally at different distances from the axis of rotation, prevents a deformation of the sheet-metal dish 38 under the high compressive and shearing forces acting on it. Since different materials can be connected to one another by friction welding, the supporting frame 39 may be manufactured from a lightweight material, for example aluminium, for a further weight saving. The disc 1' assembled in this way from the sheet-metal dish 38 and the supporting frame 39 has two annular webs 5, 5' in the region facing the axis of rotation of the shaft 3, one web 5 being part of the supporting frame 39, while the other web 5' is formed by the near-axis region of the sheet-metal dish 38. Between the two webs 5, 5' there is an annular recess 6. The shaft 3 is provided with two steps 8, 8', by means of which the webs 5, 5' of the disc 1 are connected by friction welding to the steps 8, 8' of the shaft 3 in a similar way to the exemplary embodiments described above, oblique assembly zones 12 being formed.

While, in the exemplary embodiments shown, the connection between the shaft 3 and the disc 1 is formed by the connection of two webs 5, 5' to two steps 8, 8', so that a single annular cavity 13 is obtained between the webs 5, 5' and steps 8, 8', in general the shaft 3 and the disc 1 may also have further web/step connections in the connection region 7. Further annular cavities 13 are thereby obtained, which are located between the disc 1 and the outer wall of the shaft 3.

What is claimed is:

1. Composite shaft/disc workpiece comprising:

a metallic shaft of circular cross section, an outer wall of which has a plurality of steps in a connection region, a diameter of the steps becoming larger in a direction of an axis; and an essentially rotationally symmetrical disc with, in a region of an axis of rotation, a passage hole which, in the assembled position of the disc and shaft, covers the connection region of the shaft in the axial direction, the shaft and disc being connected to one another by friction welding, wherein the passage hole of the disc has a plurality of rotationally symmetrical webs, an inside diameter of which, before the welding of the shaft and disc, fall short by a welding overlap of an outside diameter of the steps located opposite them in the assembled position, and wherein the webs of the disc are connected to the steps of the shaft by friction welding, with the result that an annular cavity is obtained between two adjacent webs.

2. Composite workpiece according to claim 1, wherein the welding overlap is between 1 mm and 6 mm.

3. Composite workpiece according to claim 1, wherein the shaft is provided with outlet orifices and/or connecting bores and/or the disc is provided with inlet orifices which issue into the annular cavity.

4. Composite workpiece according to claim 1, wherein the disc consists of a conical sheet-metal dish and of a supporting frame, the supporting frame having a plurality of annular supporting webs which project approximately in the axial direction and to which the sheet-metal dish is fastened.

5. Composite workpiece according to claim 4, wherein the sheet-metal dish and the supporting frame are connected by friction welding.

6. Composite workpiece according to claim 4, wherein the sheet-metal dish and the supporting structure consist of different materials.

7. Composite workpiece according to claim 1, wherein the shaft is a hollow shaft.

8. Composite workpiece according to claim 7, wherein an interior of the hollow shaft is closed in the connection region by a supporting element.

9. Composite workpiece according to claim 1, wherein the shaft consists of steel and is hardened in the connection region.

10. Method for producing a composite shaft/disc workpiece consisting of a metallic shaft of circular cross section, an outer wall of which is provided, in a connection region located in a defined axial position, with a plurality of steps, a diameter of which becomes larger in a direction of an axis, and of an essentially rotationally symmetrical disc with a passage hole in a region of an axis of rotation, the disc being fastened to the shaft by friction welding, wherein the disc is provided, in the region of the passage hole, with a plurality of rotationally symmetrical webs, an inside diameter of which fall short by a welding overlap of an outside diameter of the steps located opposite them in the connection region on the shaft, comprising the step of welding, at the same time as a deformation of the webs and of the steps located opposite them, to fasten the disc to the shaft in the defined axial position.

11. Method according to claim 10, wherein, before welding, the shaft and the disc are provided with inlet and/or outlet orifices for media ducts, the said orifices issuing into the outer wall of the shaft or of the disc.

12. A method for producing a composite shaft/disc workpiece wherein the shaft includes a plurality of steps and wherein the disc includes a plurality of webs, comprising the steps of:

disposing the disc on the shaft;

mating the plurality of steps with the plurality of webs; and forming a cavity by the mating of the plurality of steps with the plurality of webs on an outer circumference of the shaft.

13. The method of claim 12, further comprising the step of deforming the steps and the webs when said steps and webs are mated.

14. The method of claim 12, further comprising the step of friction welding the plurality of steps to the plurality of webs.

15. The method of claim 12, further comprising the step of disposing a supporting element within the shaft between opposing steps.

16. The method of claim 15, wherein the supporting element is a sphere.

* * * * *